UNITED STATES PATENT OFFICE.

MAX DOHRN AND ALBRECHT THIELE, OF BERLIN, GERMANY, ASSIGNORS TO CHEMISCHE FABRIK AUF ACTIEN (VORM. E. SCHERING,) OF BERLIN, GERMANY.

METHOXYMETHYLSANTALOL.

1,001,933.  Specification of Letters Patent.  Patented Aug. 29, 1911.

No Drawing.  Application filed February 15, 1911.  Serial No. 608,699.

*To all whom it may concern:*

Be it known that we, MAX DOHRN and ALBRECHT THIELE, doctors of philosophy, chemists, citizens of the German Empire, residing at Berlin, Kingdom of Prussia, German Empire, have invented a new and useful Improvement in the Production of Methoxymethylsantalol, of which the following is a specification.

Our invention relates to the manufacture of the hitherto unknown methoxymethylsantalol being a valuable pharmaceutical product.

The new compound corresponds to the formula $C_{15}H_{23}OCH_2OCH_3$ and is a colorless liquid boiling at 4 millimeter pressure between 152 to 158 centigrade. The liquid is insoluble in water and soluble in organic solvents. On heating with mineral acids especially in alcoholic solution the compound splits off formaldehyde.

The methoxymethylsantalol is obtained by causing chlormethylether to react upon santalol in the presence of a condensing agent or upon an alkali salt of santalol. In carrying out our process practically we proceed, for instance, as follows: An excess (2 molecules) of chlormethylether dissolved in toluene is at ordinary temperature gradually added to a toluene solution of 220 grams of santalol in the presence of 121 grams of dimethylanilin. The addition takes place while stirring which is continued for some hours; after standing for about 24 hours the mother liquor is removed by suction. The toluene after purification of the filtrate *in vacuo* is distilled off and the residuum fractionated.

In place of dimethylanilin other condensing agents such as sodium, sodium carbonate, tetramethyl diamidobenzene methane may be employed.

In giving the formula of this new substance as $C_{15}H_{23}OCH_2OCH_3$ we wish to call attention to the fact that the latest literature gives the formula of santalol as $C_{15}H_{23}OH$ (see Gildemeister and Hoffmann "*Die ätherischen Oele*", second edition, 1910, Vol. I, p. 417), while the older literature gives this formula as $C_{15}H_{25}OH$. (See Heusler-Pond, *Chemistry of the Turpenes*, 1902 edition, p. 426).

We claim as our invention:

The herein described new methoxymethylsantalol, corresponding to the formula $C_{15}H_{23}.OCH_2.OCH_3$, being a colorless liquid boiling at 4 millimeter pressure between 152 and 158 centigrade, insoluble in water, soluble in organic solvents, liberating formaldehyde on heating with mineral acids, and being a valuable therapeutic compound, substantially as described.

In testimony whereof we have hereunto set our signatures in the presence of two subscribing witnesses.

MAX DOHRN.
ALBRECHT THIELE.

Witnesses:
HENRY HASPER,
WOLDEMAR HAUPT.